United States Patent
Kimbrell

[15] 3,656,385
[45] Apr. 18, 1972

[54] APPARATUS FOR MACHINE FORMING EXTRUDED PLASTIC SIDING

[72] Inventor: Sol B. Kimbrell, McPherson, Kans.

[73] Assignee: Certain-Teed Products Corporation, Ardmore, Pa.

[22] Filed: Mar. 10, 1970

[21] Appl. No.: 18,157

[52] U.S. Cl..............................83/290, 83/293, 83/294, 83/300, 83/303, 83/319, 83/320, 83/599
[51] Int. Cl...............................................B26d 9/00
[58] Field of Search...............83/599, 620, 319, 320, 303, 83/300, 369, 286, 293, 294, 405, 315, 316, 317

[56] References Cited

UNITED STATES PATENTS

| 1,601,128 | 9/1926 | McFarland | 83/300 X |
|---|---|---|---|
| 1,010,571 | 12/1911 | Berg et al | 83/293 |
| 3,193,170 | 7/1965 | Pozsgay | 83/293 X |
| 3,566,728 | 3/1971 | Ohmasu | 83/319 X |
| 2,228,162 | 1/1941 | Benham et al. | 83/300 |
| 2,262,919 | 11/1941 | Bruker | 83/300 X |
| 2,301,236 | 11/1942 | Yoder | 83/300 |
| 2,653,662 | 9/1953 | Biggert, Jr. | 83/315 X |
| 2,857,966 | 10/1958 | Sarka | 83/300 X |
| 3,082,656 | 3/1963 | Day, Jr. et al. | 83/599 X |

Primary Examiner—Frank T. Yost
Attorney—Synnestvedt & Lechner

[57] ABSTRACT

Equipment is provided for machine forming, e.g., cutting off, punching, and the like, extruded siding formed of resin materials. A plurality of punch blades are mounted in a linear series for punching nail holes in the hanger edge of the siding, and a cut off knife and notching punches are mounted on a carriage and provide for cut off of lengths of the siding and for notching out portions of the hanger and butt edges, to facilitate overlapping of the siding upon installation.

8 Claims, 7 Drawing Figures

PATENTED APR 18 1972

INVENTOR
SOL. B. KIMBRELL
BY
ATTORNEYS

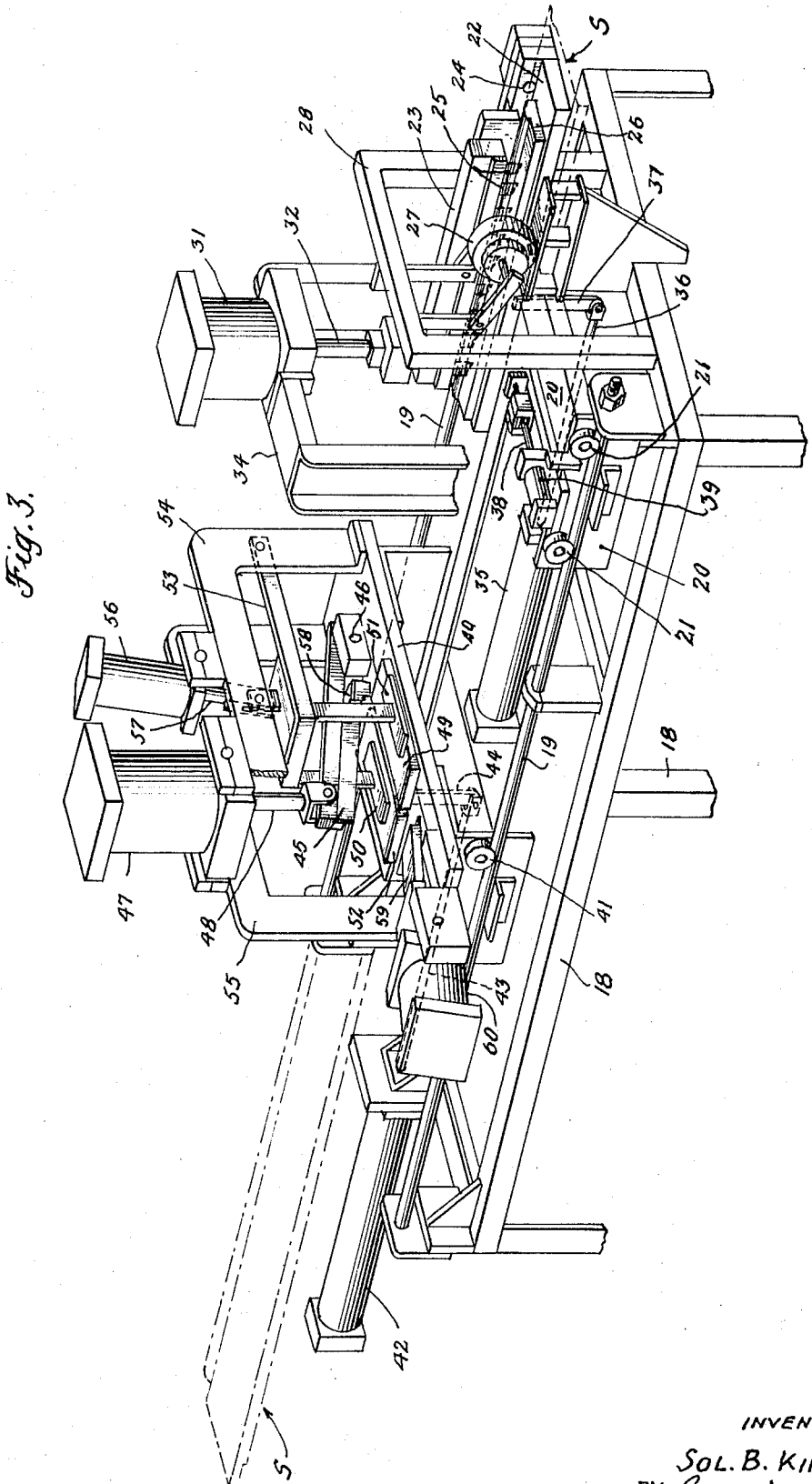

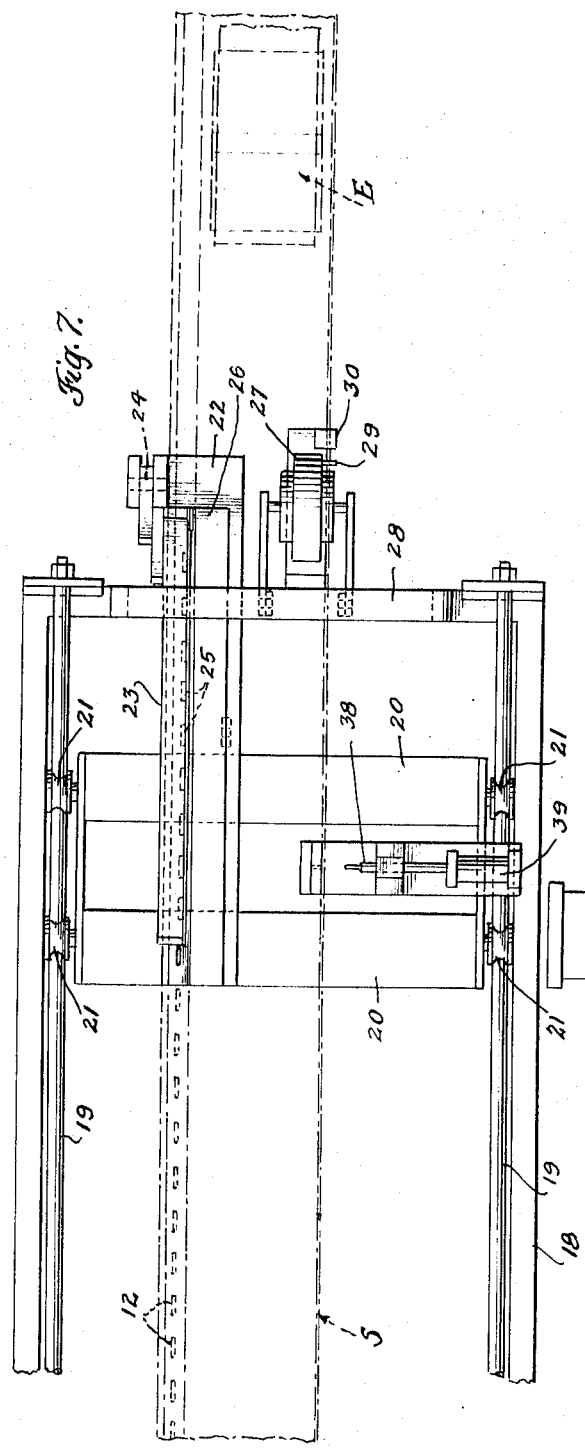

APPARATUS FOR MACHINE FORMING EXTRUDED PLASTIC SIDING

The invention relates to apparatus for use in the manufacture of siding formed of resin materials and is particularly concerned with machine forming equipment adapted to perform operations upon extruded siding after it has solidified. Various features of the invention are especially adapted for use in the production of siding having hanger and butt edges with an intervening panel in which it is desired to have the siding cut off to provide pieces or elements of predetermined length which are adapted to be overlapped not only vertically, as with siding boards of the clapboard type, but also adapted to be overlapped horizontally, endwise of the siding elements.

One of the principal objects of the invention is to provide an improved punching mechanism for punching a series of nail holes in the hanger edge portion of the siding, this mechanism being arranged to provide more uniform nail hole punching than has been practicable heretofore.

Another object of the invention is to provide an improved form of siding cut off equipment and to provide in association therewith certain notching punches adapted to effect cut out operations on portions of the hanger and butt edges.

Still further, it is a general object of the invention to arrange all of the desired punching, cut off and notching mechanisms in a manner providing for performance of all of these operations during the feed of the siding from the extruder, and without separate handling operations, so that the entire manufacture of the siding is completed in one pass or feed path extended from the extruder.

How the foregoing and other objects and advantages are attained will appear more fully from the following description referring to the accompanying drawings, in which:

FIG. 3 is a perspective general assembly view of the various components of machine forming equipment constructed and arranged according to the present invention, this equipment comprising only a portion of the overall production line shown in FIG. 1;

FIG. 6 is an enlarged elevational view of the nail hole punching equipment which also appears in FIGS. 1 and 3; and FIG. 7 is a plan view of certain parts shown in FIG. 6.

Figure 2:
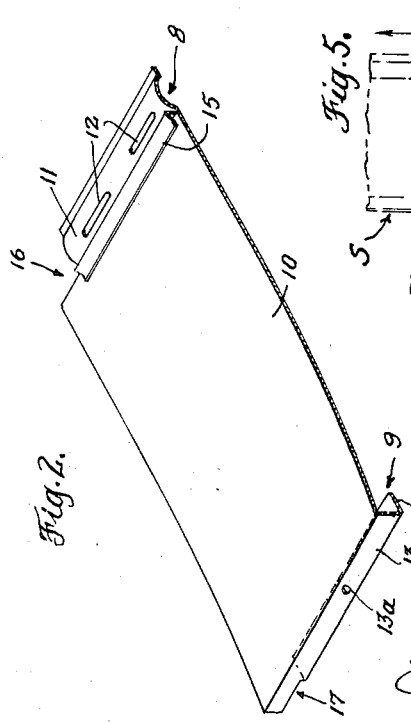
FIG. 2 is a fragmentary isometric view of a piece of one end of a siding board or element cut from the siding produced by the production line of FIG. 1.
Figure 5:
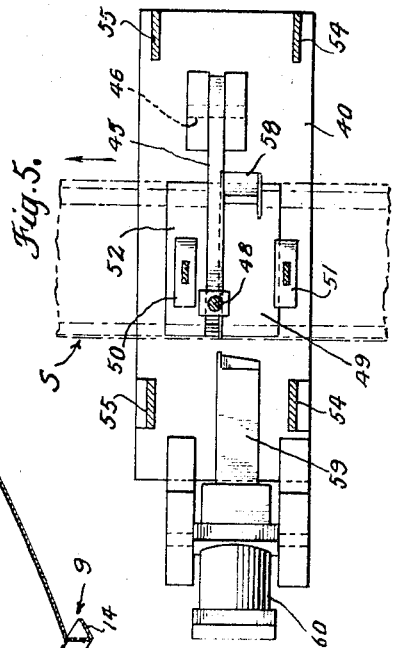
FIG. 5 is a plan view, with certain parts in horizontal section, taken as indicated by the line 5—5 on FIG. 4.

Although the equipment of the present invention is adapted for use in the production of siding of a variety of specific forms, the form illustrated in FIG. 2 is typical and in fact is a form for which the embodiment of the equipment shown is especially adapted.

The siding element or piece, of which a portion is shown in FIG. 2, includes an upper hanger edge 8 and a lower butt edge 9, with an intervening panel 10, at least the lower portion of which is curved, with the convex side presented outwardly. The hanger edge includes a curved nailing strip 11 with its convex side adapted to be placed against the siding supporting surface, this nailing strip having punched nail holes in the form of elongated slots indicated at 12. The butt edge includes a strip 13 with an upwardly turned inner lip 14 which is adapted to enter behind the clip strip 15 of a subjacent siding element, when the elements are installed upon a supporting wall.

The end portion or corner of the hanger edge is notched out as indicated at 16 at one end of the siding element, and in addition a portion of the butt edge is also notched out as is indicated at 17. These notched out corners facilitate overlapping of siding elements in end to end relation when they are installed.

Siding of the kind just described is advantageously formed of resin material, such as polyvinyl chloride resin materials and in the formation of such siding the resin material are fed to an extruder indicated generally at A. The extruder forces the plasticated resin material in heated condition through a nozzle structure B having a discharge orifice generally conforming with the cross sectional shape of the siding. If desired the siding may then be embossed to impart a grained texture to its exposed surface, for instance by means of the embossing roll arrangement indicated in outline at C in FIG. 1.

Following the embossing the siding may be passed through a cooling and shaping unit indicated generally at D, in which the siding is shaped and the resin material cooled in order to solidify it.

The siding next enters the puller or haul off mechanism E from which it is delivered to the machine forming station indicated generally by the letter F in FIG. 1 and incorporating various of the mechanisms and devices fully described hereinafter with reference to FIGS. 3 to 7 inclusive.

Upon delivery from the machine forming station F the siding is completed and is received upon the table G where it remains until each piece or element of predetermined length is cut off.

The details of the mechanisms indicated at A, B, C, D, E and G need not be considered herein as they form no part of the present invention per se.

Attention is now called to the fact that the siding is indicated in FIG. 3 in dot and dash lines at S as it passes in its feed path through the equipment shown in that figure. The siding is similarly indicated in dot and dash lines in FIGS. 5, 6 and 7, and in FIG. 4 the siding S is shown in cross section in the region adjacent to the cut off station.

As seen in various of the figures, the machine forming equipment is mounted upon supporting elements 18. Carriage mounting rods or guides 19 extend lengthwise of the path of feed of the siding over the supporting structure 18, and two separate independently movable carriages are mounted upon these rods.

One of the carriages is made up of structural pieces 20 having rollers or wheels 21 fitting and riding upon the rods 19. This carriage serves to mount a bracket 22 to which an arm 23 is pivotally connected as at 24. The pivot is arranged generally transverse to the path of feed of the siding S and is horizontally disposed so that the arm 23 may swing downwardly and upwardly toward and away from the siding. This arm carries a linear series of punches or punch blades 25 (see particularly FIG. 6), each of which has an inclined cutting edge so as to provide a shear action when engaging the siding. Beneath the siding, and also carried upon the carriage structure 20, a die 26 is provided, this die having a series of openings or apertures respectively cooperating with the punch blades 25.

By virtue of this arrangement, i.e., the employment of the linear series of punch blades with individual die openings cooperating therewith, it is practical to provide die apertures close to the dimensions of the punch blades, and this in turn increases the uniformity of hole punching, especially as compared with punch arrangements heretofore used in which punch blades were provided upon a rotative punch mounting wheel. The punch blades here employed are, of course, of elongated cross section so as to produce the desired elongated nail holes 12.

In consequence of the use of this punch arrangement, including punches and punch holes formed to relatively close tolerances, it is also possible to employ the punches for longer periods without resharpening of the punch blades.

The punch arm 23 is adapted to be actuated periodically, preferably after advance of the siding a distance equal to the length of the linear series of punches, so that the punches will again come into operation in order to continue punching uniformly spaced nail holes throughout the entire length of the siding being made. For this purpose, a metering wheel 27 is provided, this wheel being mounted independently of the carriage 20, for instance by means of a yoke 28 carried on the framing elements 18. This metering wheel has a friction surface in engagement with the siding as it is advanced in its feed path. The metering wheel carries a pin 29 (see FIGS. 6 and 7) adapted to trip the micro-switch 30 which in turn controls the introduction of fluid pressure into the cylinder 31. The cylinder has an actuating piston (not shown) therein with a piston rod 32 extended downwardly and pivotally linked with the free end of the punch arm 23 as indicated at 33. The cylinder 31 is mounted upon the carriage 20 by means of the yoke 34. As will be understood, various control devices may be interposed between the micro-switch 30 and the fluid pressure supply to the cylinder 31, and these details need not be considered herein.

Although the tripping of the micro-switch and the engagement of the punch blades 25 with the siding may serve to advance the carriage with the siding in its feed path, if desired power mechanism may be added for the purpose of moving the carriage during the punching operation. Such a power mechanism may comprise a piston and cylinder device indicated at 35, the piston 36 of which is connected to an arm 37 rigidly fastened to the carriage structure 20. This piston and cylinder device 35 may be tripped automatically by the same micro-switch 30 as is employed to actuate the piston and cylinder device 31 for the punch arm 23.

A punch device indicated at 38 is mounted upon the carriage 20 and is provided for the purpose of punching weep holes such as indicated at 13a in the butt edge of the siding shown in FIG. 2. This punch may be actuated by a piston and cylinder device 39 and is preferably triggered along with the nail hole punches periodically in consequence of rotation of the metering wheel 27.

The return motion of various of the devices described just above may be effected in various ways, for instance as a result of the action of springs within the cylinders of devices 31, 35 and 39.

After leaving the region of the carriage 20 and the devices carried thereby, the siding enters the region of a second carriage mounted upon the runners or guide rods 19. This second carriage comprises structural parts 40 having guide rollers or wheels 41 riding upon the rods 19. This carriage is preferably power actuated as by means of the piston and cylinder device indicated at 42 having a projecting piston rod 43 connected with the arm 44 which is fastened to the carriage structure 40. The devices mounted upon this carriage include the cut off knife 45 which is pivoted at 46 and which is adapted to be actuated by the piston and cylinder device 47 having a projecting rod 48 pivotally connected with the free end of the cut off knife. A cooperating anvil or shearing edge is provided on a part 49 lying beneath the siding S (see particularly FIG. 4).

For the purpose of firmly holding the siding during the shearing operation, a pair of clamping devices 50 and 51 are mounted upon the carriage 40, these clamps being respectively located downstream and upstream of the shear line. The clamps serve to tightly grip the siding against the anvil parts 49 and 52 which lie beneath the siding, one such part 49 being referred to above in connection with FIG. 4, and both of them being shown in FIGS. 3 and 5.

The clamps 50 and 51 are interconnected through a common frame and are mounted by means of arms 53 which are pivoted to the supporting yokes 54 and 55 which extend upwardly from the carriage structure 40 and serve not only to mount the clamping pads but also to mount the piston and cylinder device 47 for actuating the cut off knife. Still further the frames 54 and 55 serve to mount the piston and cylinder device 56 having a piston rod 57 pivotally connected with the arms 53 for mounting the clamping pads 50 and 51.

The cut off knife 45 also carries near its pivoted end a notching punch 58 positioned and shaped to effect the cut out 16 in the hanger edge of the siding, as shown in FIG. 2.

For the purpose of notching out the butt edge as indicated at 17 in FIG. 2, the carriage 40 further serves to mount a notching punch 59 adapted to be actuated by the piston and cylinder device 60.

As with the several devices associated with the carriage 20, the devices associated with carriage 40 may similarly be moved in the return direction by means of return springs provided, for example, in the various piston and cylinder devices such as those marked 42, 47, 56 and 60. If desired the return motion of the carriages may alternatively be effected by fluid pressure control system adapted to move the pistons within the cylinders in the carriage-return direction.

Figure 1:
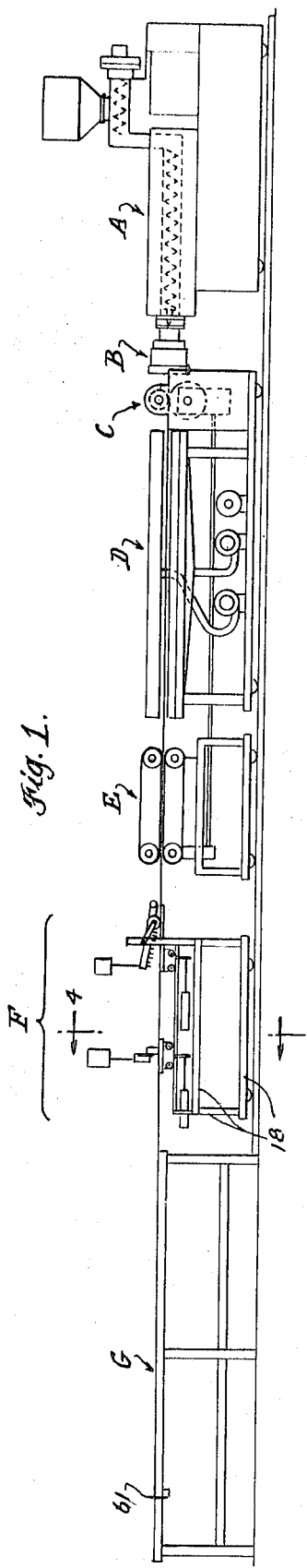
FIG. 1 is a somewhat diagrammatic elevational view of a siding production line including at least a diagrammatic indication of equipment for performing all major phases of the manufacturing operation, this production line being typical of the type of production line to which the machine forming equipment of the present invention is particularly adapted.
Figure 4:
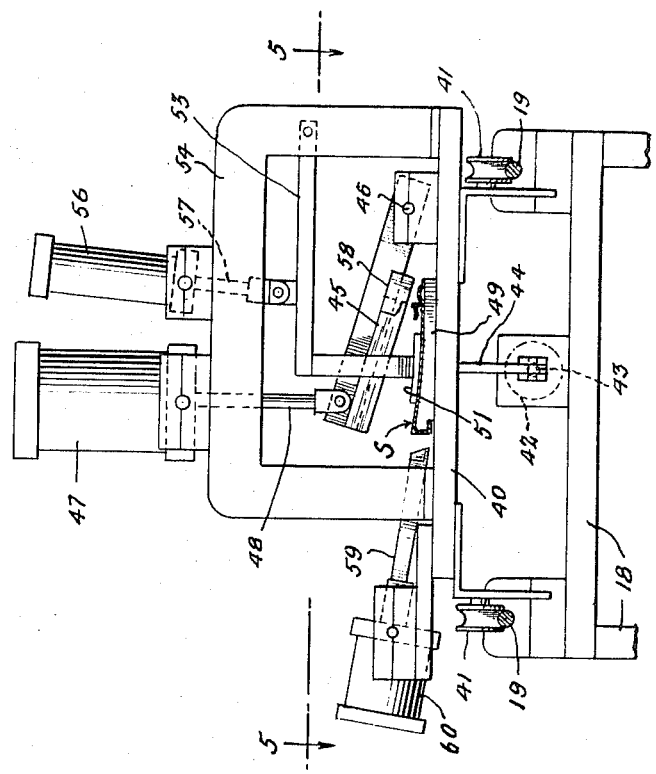
FIG. 4 is an enlarged elevational view of portions of the equipment taken substantially as indicated by the line 4—4 applied to FIG. 1.

Although various specific control systems may be employed in connection with the operation and actuation of the devices mounted upon the carriage 40, the following is a preferred sequence of operations:

First note that in FIG. 1 at 61 a limit or trip switch is indicated, this switch preferably being positioned upon the table G at a distance from the location of the cut off knife 45 slightly less than the desired length of the siding pieces or elements. When the siding trips this switch, the switch actuates the piston and cylinder device 56 so as to clamp the product to the carriage 40. The power cylinder 42 for moving the carriage is then also actuated and after travel for a short distance, for instance about 1 inch, the carriage actuates another switch (not shown), thereby actuating the piston and cylinder device 60 for the notching punch 59. When the notching punch has been actuated and again withdrawn, the control for the piston and cylinder device 47 of the cut off knife is tripped and the knife 45 effects the cut off of the desired length of siding and also notches out the corner 16 of the hanger edge. Retraction of the cut off knife then trips the control to release the clamps 50 and 51, after which the carriage 40 returns to its starting position.

By arranging the various machine forming devices upon the two carriages in the manner above referred to, a desirable sequence of operations is effected and this is accomplished in continuous flow of the product from the extruder and without any intermediate handling or rehandling of siding pieces. Moreover, the nail hole punching operation progresses uniformly throughout the entire length of the siding in advance of the time of cut off of individual siding pieces, in consequence of the action of the metering wheel riding on the surface of the siding. Since the carriages 20 and 40 and the equipment carried thereby are located downstream of the haul off mechanism F, the siding has steady and uniform feed to and through the machine forming devices.

I claim:

1. Apparatus for use in machine forming extruded resin siding having hanger and butt edges with an intervening panel, comprising mechanism for punching spaced nail holes in the hanger edge including means for guiding the extruded siding endwise through a predetermined feed path, a plurality of punch blades mounted in a linear series at one side of the feed path, die mechanism at the opposite side of the feed path and having a linear series of die openings for cooperating respectively with the several punch blades, means for periodically actuating the punch blades as the siding advances through the feed path, a first carriage for mounting said punch and die mechanism, said first carriage being mounted for motion in the direction of feed of the siding through said feed path during the punching operation, mechanism for cutting off siding pieces of predetermined length located downstream from said punch and die mechanism, said cutting off mechanism including means for guiding the extruded siding endwise through a predetermined feed path and a cut off knife, said cutting off mechanism being mounted on a second carriage movable independently of said first carriage and mounted for motion in the direction of feed of the siding through said feed path during the cut off operation, and means for periodically actuating the knife as the siding advances through the feed path.

2. Apparatus as defined in claim 1 including a pivoted arm for mounting the punch blades, and further in which the means for periodically actuating the blades comprises power mechanism connected with the blade mounting arm.

3. Apparatus as defined in claim 1 and further including a metering wheel running in engagement with the siding as it advances through its feed path and control mechanism operated by the metering wheel to periodically actuate the punch blades.

4. Apparatus as defined in claim 1 and further including a punch mounted on said first carriage for punching a weep hole in the butt edge of the siding when the nail hole punches are actuated.

5. Apparatus as defined in claim 1 further including power means for advancing the first carriage with the siding during the punching operation.

6. Apparatus as defined in claim 1 and further including, a notching punch mounted on said second carriage for removing a portion of the hanger edge of the siding, clamping means mounted on the second carriage for holding the siding during the cut off and notching operations, and means for periodically actuating the notching punch as the siding advances through the feed path.

7. Apparatus as defined in claim 6 in which the clamping means includes clamps located both upstream and downstream of the cut off knife.

8. Apparatus for use in maching forming extruded resin siding having hanger and butt edges with an intervening panel, comprising mechanism for cutting off siding pieces of predetermined length and for notching out portions of the hanger and butt edges at one end of the siding pieces, said mechanism including means for guiding the extruded siding endwise through a predetermined feed path, a cut off knife, a notching punch for removing a portion of the hanger edge of the siding, common mounting means for said knife and said punch, a notching punch mounted independently of the cut off knife for notching out a portion of the butt edge of the siding pieces, a common carriage for the cut off knife and both of the notching punches, and means for periodically actuating the knife and notching punches as the siding advances through the feed path, the carriage being mounted for motion in the direction of feed of the siding through said feed path during the cut off and notching operations.

* * * * *